US012637175B2

(12) United States Patent　　　　(10) Patent No.:　US 12,637,175 B2

LeBlanc　　　　　　　　　　　　　　　(45) Date of Patent:　May 26, 2026

(54) ENDLESS TRACK CONVEYANCE MACHINES HAVING A TORQUE ASSIST SYSTEM FOR ENHANCING PERFORMANCE AND A BATTERY TEMPERAURE ASSIST

(71) Applicant: Barnabas LeBlanc, Meeker, CO (US)

(72) Inventor: Barnabas LeBlanc, Meeker, CO (US)

( * ) Notice: Subject to any disclaimer, the term of this patent is extended or adjusted under 35 U.S.C. 154(b) by 26 days.

(21) Appl. No.: 18/928,030

(22) Filed: Oct. 27, 2024

(65) Prior Publication Data

US 2025/0050973 A1　　Feb. 13, 2025

Related U.S. Application Data

(63) Continuation of application No. 17/171,049, filed on Feb. 9, 2021, now Pat. No. 12,214,844.

(51) Int. Cl.
B62M 27/02　　　(2006.01)
B60L 7/10　　　(2006.01)
　　　　(Continued)

(52) U.S. Cl.
CPC ............... B62M 27/02 (2013.01); B60L 7/10 (2013.01); B60L 58/26 (2019.02); B62D 55/30 (2013.01);
　　　　(Continued)

(58) Field of Classification Search
CPC .. B62M 27/02; B62M 9/02; B62M 2027/021; B62M 2027/027; B62M 23/02;
　　　　(Continued)

(56) References Cited

U.S. PATENT DOCUMENTS

| 3,667,562 | A | 6/1972 | Compton |
| 4,072,203 | A | 2/1978 | Pierson |

(Continued)

FOREIGN PATENT DOCUMENTS

| BR | PI090510 | A2 | 6/2011 |
| EP | 2707936 | B1 | 8/2018 |
| WO | 2018215693 | A1 | 11/2018 |

OTHER PUBLICATIONS

Title: Electric Skiing Vehicle Single Board Fue! Snowmobile Directional Snow Sledge Skiing Website: https://www.dhgate.corn/producl/wholesale-electric—skiing-vehicle-single/406731704.html Date: Downloaded Page on Mar. 3, 2020 Google Search 1.

(Continued)

*Primary Examiner* — Long T Tran
*Assistant Examiner* — Charles J Brauch
(74) *Attorney, Agent, or Firm* — Russ Weinzimmer

(57)　　　　ABSTRACT

Conveyance vehicles such as snow bikes and snowmobiles having an endless track system driven by a combustion engine are enhanced in performance with a torque assist system. The torque assist system includes an electric motor that is coupled to drive the track in parallel with the original internal combustion engine through either its own track drive, or through the drive system of the engine. The motor can be a spindle drive motor or hub motor. Torque assist is generated through a torque assist throttle input coupled to a motor controller. A battery temperature assist system diverts heated cooling fluid from the engine cooling system to heat the battery through its own heat exchanger. The controller is coupled to a processing device such as a smart phone that executes apps configured to provide parametric data to the controller and to receive parametric data from the controller through a user interface.

7 Claims, 11 Drawing Sheets

(51) Int. Cl.

| | |
|---|---|
| *B60L 58/26* | (2019.01) |
| *B62D 55/30* | (2006.01) |
| *B62J 17/00* | (2020.01) |
| *B62M 9/02* | (2006.01) |
| *F01P 5/10* | (2006.01) |
| *F01P 7/14* | (2006.01) |
| *F01P 7/16* | (2006.01) |
| *F28F 27/02* | (2006.01) |
| *H01M 10/46* | (2006.01) |
| *H01M 10/625* | (2014.01) |
| *H01M 10/63* | (2014.01) |
| *H01M 10/6556* | (2014.01) |
| *H01M 10/6563* | (2014.01) |
| *H01M 10/6568* | (2014.01) |
| *H01M 10/663* | (2014.01) |

(52) U.S. Cl.
CPC ............... *B62J 17/00* (2013.01); *B62M 9/02* (2013.01); *F01P 5/10* (2013.01); *F01P 7/16* (2013.01); *F28F 27/02* (2013.01); *H01M 10/46* (2013.01); *H01M 10/625* (2015.04); *H01M 10/63* (2015.04); *H01M 10/6556* (2015.04); *H01M 10/6563* (2015.04); *H01M 10/6568* (2015.04); *H01M 10/663* (2015.04); *B62M 2027/021* (2013.01); *F01P 2007/146* (2013.01); *H01M 2220/20* (2013.01)

(58) Field of Classification Search
CPC ..... B62M 2027/023; B60L 7/10; B60L 58/26; B60L 50/15; B60L 58/27; B62D 55/30; B62J 17/00; B62J 43/16; B62J 43/28; B62J 41/00; F01P 5/10; F01P 7/16; F01P 2007/146; F01P 3/20; F01P 2050/16; F01P 2050/24; F28F 27/02; H01M 10/46; H01M 10/625; H01M 10/63; H01M 10/6556; H01M 10/6563; H01M 10/6568; H01M 10/663; H01M 2220/20; H01M 10/617; H01M 50/204; H01M 50/249; B60K 2001/008; B60K 6/48; B60K 11/02; B60W 2300/44; B60Y 2200/252; B60Y 2400/3012
See application file for complete search history.

(56) References Cited

U.S. PATENT DOCUMENTS

| | | | |
|---|---|---|---|
| 6,095,275 A | 8/2000 | Shaw | |
| 6,112,840 A | 9/2000 | Forbes | |
| 6,573,675 B2 | 6/2003 | Schmitz et al. | |
| 6,626,258 B1 | 9/2003 | Forbes | |
| 7,343,991 B2 | 3/2008 | Rittenhouse | |
| 7,448,328 B2 | 11/2008 | Kumar | |
| 7,681,676 B2 | 3/2010 | Kydd | |
| 7,798,261 B1 | 9/2010 | Rittenhouse | |
| 8,051,637 B2 | 11/2011 | Labrador | |
| 8,225,608 B2 | 7/2012 | VVu et al. | |
| 10,293,883 B1 | 5/2019 | Bedard et al. | |
| 2008/0308328 A1 | 12/2008 | Kejha | |
| 2011/0281679 A1 | 11/2011 | Larrabee et al. | |
| 2020/0361273 A1* | 11/2020 | Borud ................... | B60K 11/06 |

OTHER PUBLICATIONS

Title: Canadian "Loki" Stealti1 Hybrid Military Vehicle: A Snowmobile Website: https:!/,w1w.greencarreports.com/news/1086328_canadian-loki-steatth-hybrid-military-vehic!e-a-snowmobile Date: Downloaded Page on Mar. 3, 2020.

* cited by examiner

ENDLESS TRACK CONVEYANCE MACHINES HAVING A TORQUE ASSIST SYSTEM FOR ENHANCING PERFORMANCE AND A BATTERY TEMPERAURE ASSIST

CROSS-REFERENCE TO RELATED APPLICATIONS

This application is a Continuation of application Ser. No. 17/171,049, filed Feb. 9, 2021, entitled "ENDLESS TRACK CONVEYANCE MACHINES HAVING A TORQUE ASSIST SYSTEM FOR ENHANCING PERFORMANCE AND A BATTERY TEMPERATURE ASSIST", the entire contents of which is herein incorporated by reference.

FIELD OF THE INVENTION

The invention relates generally to endless track conveyance machines, and more particularly to enhancing the performance of such conveyance machines.

BACKGROUND OF THE INVENTION

The torque generated by any motor has a peak level that is produced over a subset of the range of revolutions per minute (RPMs) that can be generated by the motor. There is always a trade-off in design between the peak level of torque that can be produced by a motor, and the range of RPMs over which that peak torque can be delivered. Motors are designed to have torque curves that serve the intended function for the motor.

Endless track conveyance machines such as snowmobiles and snow bikes are typically powered by internal combustion engines. These engines are often designed to deliver peak torque at higher ranges of RPMs to maximize power and thus acceleration at higher RPMs. As such, their torque performance at the lower end of the RPM range may leave much to be desired, as the engine will take longer to achieve the range of rotational speed at which the torque reaches its peak.

SUMMARY OF THE INVENTION

A torque assist system is provided that enhances the performance of any conveyance vehicle that employs an endless track system that is driven by an internal combustion engine. The torque assist system employs an electric motor that can be coupled in parallel with the combustion engine to drive the track system through its own dedicated driver, or it can be coupled into the drive system through which the engine drives the track system. The electric motor can be any electric motor that can be so coupled, and that has a torque profile that will provide greater torque over a desired predetermined range of RPM of the track than that of the engine to assist the engine in achieving more quickly the range of RPM where its torque and power are at a maximum. The electric motor chosen will be dictated by the purpose of the conveyance and thus the range of RPM for which torque enhancement best suits that purpose.

The torque assist system also necessarily includes a battery by which to power the electric motor. To provide the electric motor's maximum torque to the track in response to maximum throttle, the battery must be operated at or above a minimum temperature. Many applications of such conveyance machines can occur in cold weather. To ensure that the battery reaches a temperature that ensures it can provide a maximum current (especially from a cold start), the torque assist system can include a battery temperature assist subsystem that diverts cooling fluid that has been heated by the combustion engine to a heat exchanger in thermal communication with the battery.

In one aspect of the invention, a conveyance machine includes an internal combustion engine having a drive system coupled to a track. The engine is configured to apply rotational force to the track through the drive system to propel the conveyance machine in a forward direction along the ground. The engine is configured to produce torque relative to its rotational speed in response to an engine throttle. The conveyance machine also includes an engine cooling system filled with cooling fluid. The cooling system pumps the cooling fluid through the engine during its operation to draw heat from the engine into the cooling fluid and then further through a first heat exchanger by which to transfer the heat from the cooling fluid to ambient air. The engine cooling system has a source coolant line to conduct heated cooling fluid exiting the engine to the first heat exchanger The conveyance machine further includes an electric motor powered by a battery. The battery is coupled to the track through a motor driver. The electric motor is configured to apply rotational force to the track in parallel with the engine to propel the conveyance machine in either a forward or reverse direction. The motor is configured to produce peak torque relative to its rotational speed in response to a motor throttle.

A battery temperature assist system raises the temperature of the battery to a level that ensures maximum current availability. It includes a secondary source coolant line in fluid communication with the source coolant line of the engine cooling system to divert a fraction of the heated cooling fluid therefrom. It further includes a second heat exchanger in thermal communication with the battery, the second heat exchanger configured to receive the diverted fraction of the heated cooling fluid and to transfer the heat from the heated cooling fluid to the battery as it flows therethrough. It also includes a secondary return coolant line in fluid communication with the source coolant line of the engine cooling system to return the diverted fraction of the cooling fluid back to the engine cooling system.

The torque that can be produced by the electric motor peaks over a range of rotational speed of the track that is different than the range of rotational speed of the track at which the torque that can be produced by the engine peaks.

In an embodiment, the battery and the first heat exchanger are disposed in a heat isolating housing.

In another embodiment, the secondary return coolant line further includes a valve disposed therein to interrupt circulation of the diverted fraction of the cooling fluid through the second heat exchanging body when the diverted fluid exits the second heat exchanger at a temperature that exceeds a predetermined temperature.

In still another embodiment, the valve is a thermostatically controlled ball valve.

In yet another embodiment, the heat isolating housing further includes at least one thermostatically controlled fan for cooling the battery when the temperature inside the housing reaches or exceeds a predetermined temperature.

In a further embodiment, the conveyance machine further including a motor controller, the motor controller being coupled to the battery and the motor to control the magnitude of current being delivered from the battery to the motor in response to a signal provided from the motor throttle to the controller and in accordance with a specified torque profile file.

In a still further embodiment, the battery housing and the controller are surrounded by a fairing coupled to and supported by the conveyance machine, the fairing providing protection from at least weather related elements.

In yet another embodiment, the motor controller is coupled to a processing device. The processing device executes an app program that downloads the torque profile. The torque profile is selected from a plurality of torque profiles through a user interface.

In still another embodiment, the controller places the motor in a regenerative braking mode when the motor throttle is at a zero current position to cause the motor to generate current by which to re-charge the battery.

In another embodiment, the fairing includes snow filtered adjustable vents to allow cool air to moderate the temperature of the battery.

In another aspect of the invention, a conveyance machine includes an internal combustion engine coupled to a track through a drive system. The engine is configured to transfer rotational force to the track through the drive system to propel the conveyance machine in a forward direction when the track is in contact with the ground. The engine is configured to produce torque relative to its rotational speed in response to an engine throttle.

The conveyance machine also includes an electric motor that is powered by a battery and is coupled to the track through a motor driver. The electric motor is configured to apply rotational force to the track through the driver in parallel with the engine, to turn the track and thereby propel the conveyance machine in either a forward or reverse direction. The motor is configured to produce peak torque relative to its rotational speed in response to a motor throttle.

A motor controller is coupled to the battery and the motor and is configured to control the magnitude of the current being delivered from the battery to the motor at least in response to a signal provided from the motor throttle to the controller, and in accordance with a specified torque profile. A processing device, in communication with the motor controller, is configurable to run application programs that include a user interface through which parametric information may be input by a user to dictate to the controller how the motor performs. That parametric information includes the torque profile.

In an embodiment, when the motor throttle is at a zero current position, the controller places the motor in a regenerative braking mode to generate charging current to re-charge the battery.

In another embodiment, a user specifies a braking level of the regenerative braking mode through an app executed by the processing device, causing the controller to establish a magnitude of EMF (electromotive force) generated by the motor that correlates to the specified braking level.

In still another embodiment, the electric motor is a hub motor, the hub motor having a fixed axle, the fixed axle being supported at both ends by a pair of suspension rails, the hub motor having teeth by which to engage with and drive the track.

In yet another embodiment, the conveyance machine is a snow bike, and the hub motor has been mounted in place of a rear track tensioner wheel of the snow bike.

In a further embodiment, the conveyance machine is a snowmobile, and the hub motor has been mounted in place of a rear track tensioner wheel of the snowmobile.

In a still further embodiment, the electric motor is a spindle motor having a spindle drive motor, a driver having a drive shaft, and a sprocket coupled to the drive shaft. The spindle drive motor is coupled through a chain to a sprocket to turn the drive shaft. The drive shaft is supported at both ends by one of a pair of suspension rails, the driver having teeth by which to engage with and drive the track.

In yet another embodiment, the conveyance machine is a snow bike and the drive of the spindle motor has been mounted in place of a rear track tensioner wheel of the snow bike.

In still another embodiment, the conveyance machine is a snowmobile, and the drive of the spindle motor has been mounted in place of a rear track tensioner wheel of the snow bike.

In another embodiment, the sprocket of the spindle motor is coupled directly to a sub-drive shaft of the engine drive system instead of a rear driver.

Thus, the torque assist system of the conveyance machine provides additional torque at lower ranges of the engine's available RPMs to assist it in reaching the range of higher RPMs over which the engine's torque is designed to peak, and can provide immediate supplemental torque in situations where the load on the internal combustion engine (ICE) is high at lower RPMs.

DETAILED DESCRIPTION

Conveyance machines such as snow bikes and snowmobiles employ a spinning or endless track system that is rotationally driven by an internal combustion engine to engage with snow surfaces by which to propel the conveyance machine. Snow bikes are most commonly created using commercially available conversion kits configured to convert a motorcycle or dirt bike, intended to operate on surfaces with no snow, into a snow a machine that can operate on snow surfaces. These conversion kits typically include a steering ski that replaces the front tire of the motorcycle or dirt bike, and a rear track system that replaces the rear wheel to provide the propulsive force. The track system is provided with parts necessary to couple the track system to the combustion engine's drive system to provide the rotational force causing the track to spin. Snowmobiles are typically purpose built machines sold by an original equipment manufacturer (OEM) to operate on the snow. While the front steering skis and the track systems of snowmobiles and snow bikes are not identical, they are substantially analogous.

Disclosed herein are embodiments of a torque assist system 100 for enhancing the performance of conveyance machines such as snow bikes and snowmobiles. Embodiments of the system include an electric motor, which is coupled to the track system in parallel with an internal combustion engine, to provide a user discretionary boost in torque applied to the track of the conveyance machine over a range of RPMs of the track for which the torque of the internal combustion engine is low. Because they are both jointly coupled into the drive of the track system, the engine and the motor work synergistically to add their respective peak power available for any given throttle setting for each. The electric motor can enhance performance of the conveyance machine by reducing the time required for the RPMs of the track to reach a range over which the torque provided by the engine peaks, thereby reducing the time in which the engine reaches its maximum power and speed.

In addition, because the electric motor requires a battery as its source of power, some embodiments also include a battery temperature-assist system for boosting the temperature of the battery, particularly on a cold start. The battery temperature-assist system uses heat initially generated by the internal combustion engine to ensure that the battery is able to source maximum current when demanded by a user after a cold start of the snow conveyance machine in winter climates.

Figure 1:
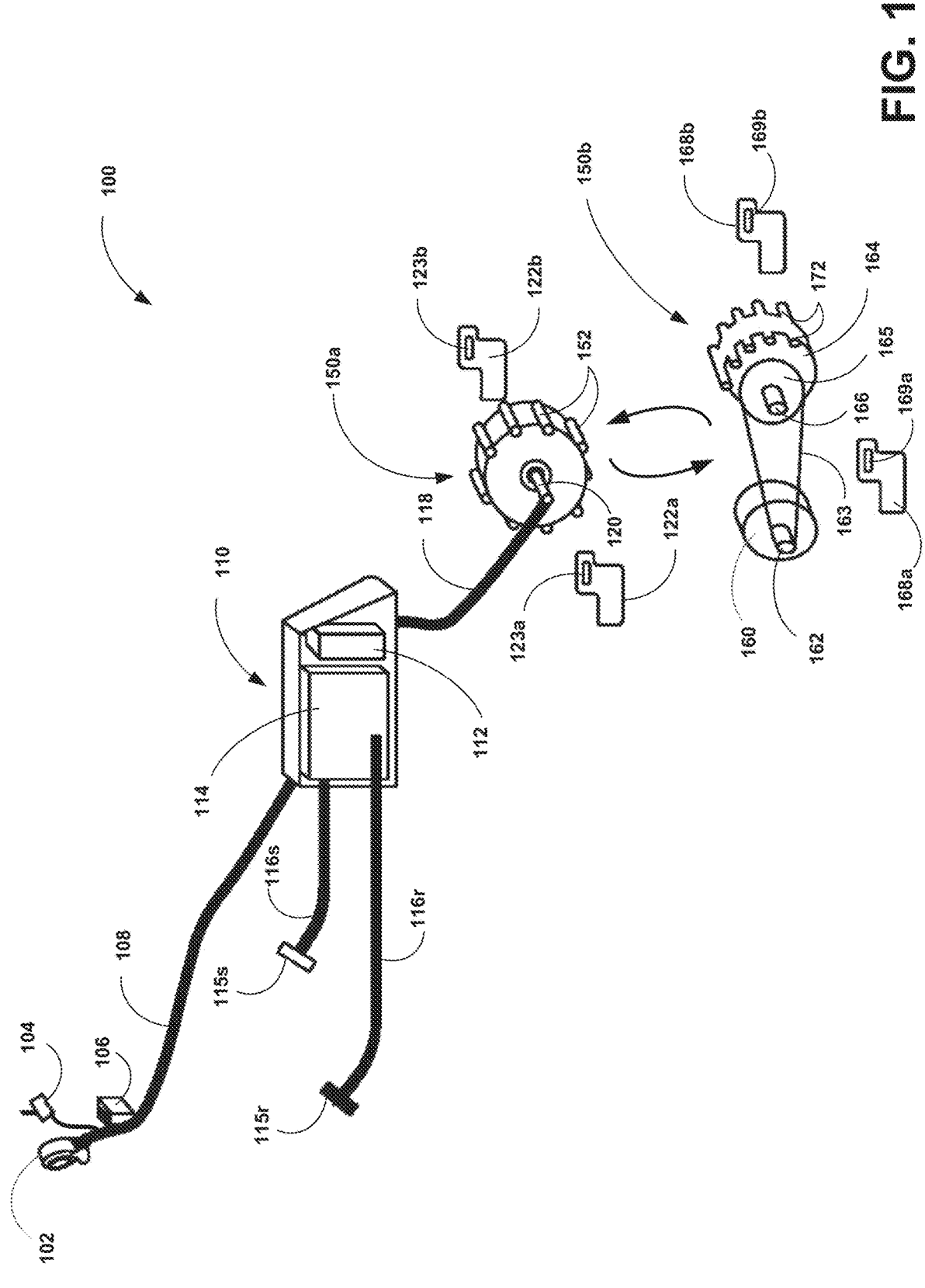
FIG. 1 is an exploded view of the components of embodiments forming the torque assist system of the invention that can be installed to enhance the performance of a snow conveyance machine using an electric motor.

FIG. 1 shows an exploded view of an embodiment of a set of enhancement components 100 of the invention without the conveyance machine. These components 100 can be either provided as a kit by which to modify and thereby enhance the performance of an aftermarket OEM snow conveyance machine, or they could be included in the original set of components purpose built into an OEM snow conveyance machine to provide the enhanced performance.

In one embodiment, the set of enhancement components 100 of the invention includes an electric hub motor 150a.

Hub motor 150a is installed to rotate around a fixed axle 120 and includes features such as involute or extrovert teeth 152 configured to engage with features of a track (not shown in FIG. 1) of a snow conveyance machine. These features can be similar to the same types of features as those used to couple the combustion engine with the track of the snow conveyance machine, which is driven by its internal combustion engine. Those of skill in the art will appreciate that the features such as teeth 152 are well known in the art for engaging with conveyance tracks such as those used in snow bikes and snowmobiles.

The hub motor 150a is thereby configured to engage with the conveyance track to assist the internal combustion engine in turning the track to propel the snow conveyance machine. The hub motor 150a is configured to be conveniently installed in place of a track tensioner wheel that is originally installed on such conveyance machines to maintain tension on the track as it turns. Brackets 122a, b are designed to support the hub motor 150a and its fixed axle 120 through openings 123a, b. They are designed to replace the originally installed brackets that are designed to hold the track tensioner wheel in place. Installation of the hub motor 150a and brackets 122a, b will be illustrated and described in more detail below. Those of skill in the art will appreciate that any electric motor having a fixed axle where the housing of the motor itself rotates such as, for example, an outrunner Halbach array motor.

In an alternate embodiment, an electric spindle motor 150b can be used in lieu of the hub motor 150a to assist the conveyance machine's engine in turning the track. Spindle motor 150b consists of a spindle driver motor 160 that turns spindle drive axle 162, which engages with and drives chain 163. Chain 163 engages with sprocket 163, which then turns rear driver 164. Rear driver 164 includes track engagement features 172, which can be, for example, involute teeth or extrovert teeth designed to engage with features of the track that permit the rear driver to apply rotational force to the track. Brackets 168a, b are configured to support the live axle 166 of the rear driver in openings 169a, b. Installation of the spindle motor 150b will be illustrated and described in more detail below.

Those of skill in the art will appreciate that the two electric motors 150a, b can be driven by a control circuit 112, which is disposed within a fairing 110 and configured to control the magnitude of the current drawn from a battery by the motor 150a, b. The battery (See 605, FIG. 6) is disposed in a battery housing 114 that is also enclosed within fairing 110. Fairing 110 serves to protect the control circuit and the battery box or housing 114, by preventing their exposure to snow and weather related moisture and particulate matter.

The magnitude of the current drawn from the battery 605 and supplied to the motor through electrical wiring harness 118 is dictated by the user through a torque assist throttle 102 that provides an electrical signal output that is coupled to the controller 112 through wiring harness 108. The magnitude of the current supplied to the electric motor 150a, b is related to the amount of torque generated by the motor 150a, b in accordance with its torque curve. Wiring harness 118 delivers current to the phases of the electric motor 150a, b and returns feedback information to the controller 112, including the amount of current being drawn by each phase of the electric motor 150a, b.

Wiring harness 108 can be further coupled to an input device such as a toggle switch that permits the electric motor to be switched between (and thereby operate in) forward and reverse modes. Wiring harness 108 can provide additional control inputs to the controller 112 from a data processing device 106 such as a smart phone or other forms of PDAs, providing a user interface by which to control other aspects of the motor's 150*a, b* operation. This can include downloading various torque profiles to the controller 112 by which to selectively alter the torque curve of the motor 150*a, b*, prior to or even during operation of the snow conveyance machine. In addition, the controller 112 can be programmed through the user interface of the processing device 106 to set the regenerative braking level of the electric motor when the motor is in regenerative braking mode (e.g. when the torque assist motor throttle 102 is set to a zero position). Finally, wiring harness 108 can also receive parametric output from the controller 112 for display by the user interface of the processing device 106.

Because snow conveyance machines such as snow bikes and snowmobiles are used in cold weather, cold starts of these machines require that the engine first warm up so that the lubricant for the engine can be properly circulated. Adding an electric motor 150*a, b* to provide torque assistance presents an issue regarding cold weather as well. The battery that is used to supply current to any electric motor cannot supply full current to the motor when it is cold. Thus, the battery must also be warmed up so that full current can be delivered to the motor on demand from a user.

Thus, the embodiment of the set of components 100 of FIG. 1 also provides a battery temperature-assist system for using the heat generated by the internal combustion engine to warm the battery 605 as the engine heats up so that it is able to provide full current on demand from a user. Snow conveyance machines require a cooling system to cool the engine. Such a system typically includes cooling fluid that is pumped into the engine to draw heat from the engine, and which upon exit from the engine, is further pumped through a heat exchange device such as a radiator, a tunnel cooler or the like, to transfer the heat absorbed by the cooling fluid to the ambient environment.

Source and return coolant conducting lines 116*s, r* (respectively) are provided with termination means 115*s, r* that are configured to be coupled in sealable fluid communication with the coolant line through which the cooling fluid is pumped as it exits the engine on its way to the heat exchanging device of the cooling system for the engine. Thus, battery supply line 115*s* is configured to divert a portion of the cooling fluid that has exited the engine and has therefore been heated by the engine, to the battery housing 114. As will be discussed in more detail below with reference to FIGS. 5 and 6, the heated coolant is pumped through a heat exchange element that is located in physical proximity to the battery 605 by which heat is transferred to the battery.

Figure 2:
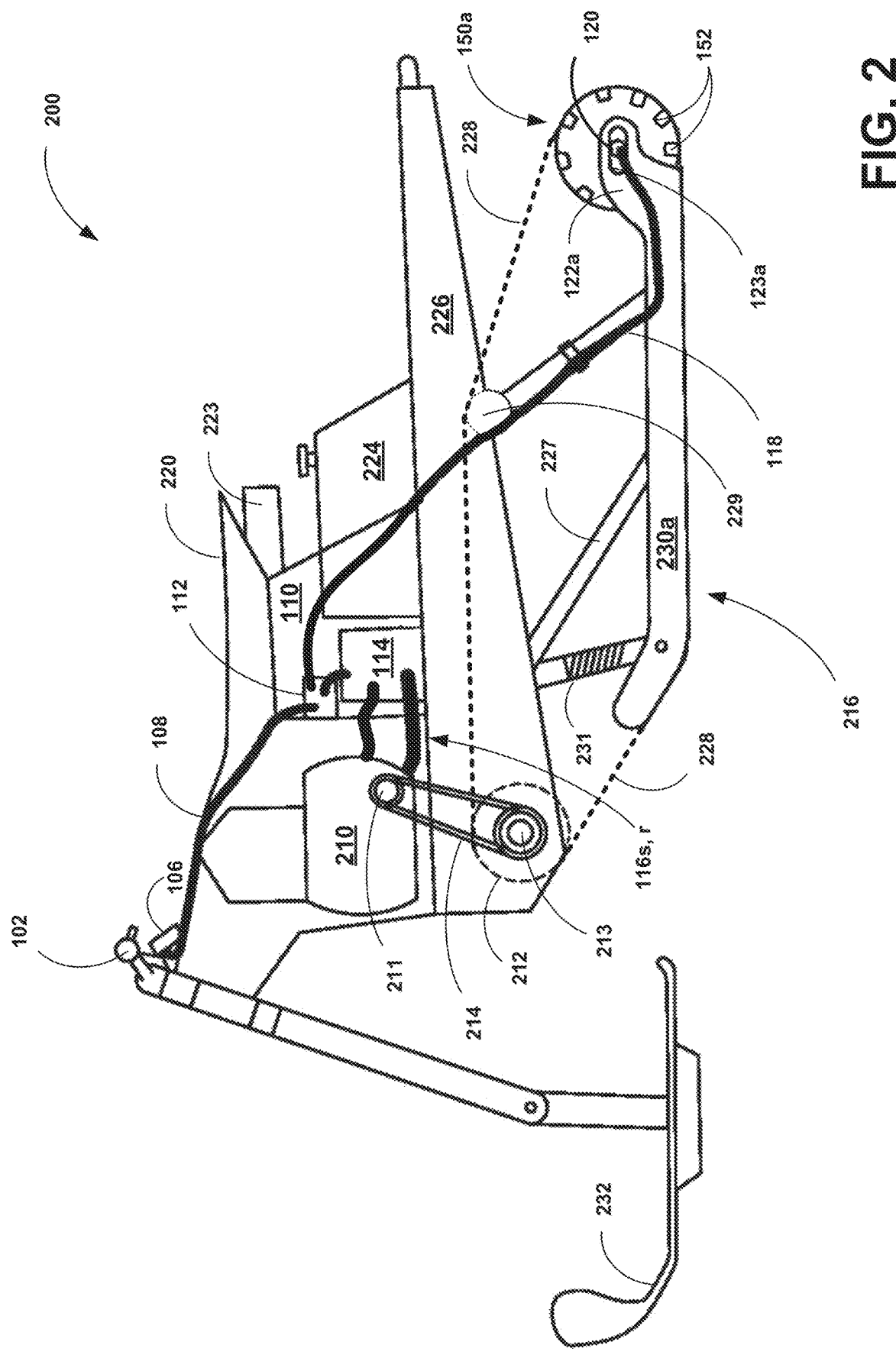
FIG. 2 is a side view of an embodiment of a snow bike that has been enhanced with installation of an embodiment of the torque assist system of FIG. 1.

FIG. 2 illustrates an embodiment of a snow bike 200 that has been enhanced with an embodiment of the enhancement components illustrated in FIG. 1. The snow bike 200 has an internal combustion engine 210 that is coupled to a rear track system 216 and has a steering ski 232 in communication with handlebars (not shown). The crankshaft of engine 210 has been coupled to the jack drive 212 of the rear track system, by way of drive chain 214, which is coupled to the jackshaft 213 of jack drive 212. Track engagement features of jack drive 212 are received by features in the track 228 to exert turning force (i.e. torque) on track 228 to linearly propel the snow bike 200 over terrain preferably covered with snow. The rear track system 216 further includes parallel suspension rails 230*a* and 230*b* (not shown), that are coupled with tunnel 226 through one or more shocks 231 and support arms 227. Track 228 is supported over idler wheels 229 as it travels through the tunnel 226.

The performance of the snow bike 200 is enhanced by the components 100 of the invention to provide torque assist through the hub motor 150*a*. The hub motor 150*a* physically occupies the location once occupied by the original tensioner wheel (not shown) that was provided as part of the rear track system. Brackets 122*a* and 112*b* (not pictured) are configured to support the hub motor 150*a* at its fixed axle 120 through opening slots 123*a* and 123*b* (not shown) and replace the brackets originally provided as part of the rear track system to support the track tensioner wheel.

Electrical harness 118 couples the electric motor with the controller 112. The controller 112 controls the amount of current supplied to the hub motor 150*a* for a given position of the torque assist throttle 102, and the torque curve used by the controller 112. Electrical harness 108 provides various signals to the controller 112, including the position of the torque assist throttle, the position of the forward/reverse toggle switch 104, the regenerative braking level and parametric information provided by the processing device 106 to the controller 112, as well as parametric data from the controller 112 to be displayed on the processing device 106.

Battery temperature-assist system supply and return hoses 116*s, r* are coupled into the coolant line of the cooling system that conducts heated cooling fluid leaving the engine 210 to the radiator or tunnel cooler (not shown). The supply line or hose 116*s* diverts a portion of the heated cooling fluid to the battery housing and through a heat exchanger in close proximity to the battery 605 and return line 116*r* returns the cooling fluid back to the line and downstream from the supply line 116*s*.

Controller 112 and battery housing 114 are preferably located under the seat 220 as illustrated, to center the additional weight of the battery 605 beneath a rider. In some snow bike designs, the gas tank 224 is often located under the seat 220, which may require the gas tank to be shifted rearwardly to accommodate the controller 112 and battery housing 114. A fairing 110 is provided to surround the controller 112 and batter box 114 to protect them from snow and other forms of precipitation, wind, and particulate matter. The fairing 110 can also include an opening to accommodate part of the gas tank 224 that remains under the seat. The faring 110 may also have to have an opening to accommodate the exhaust pipe 223, which also commonly runs under the seat for dirt bikes that have been converted to snow bikes.

Figure 3:
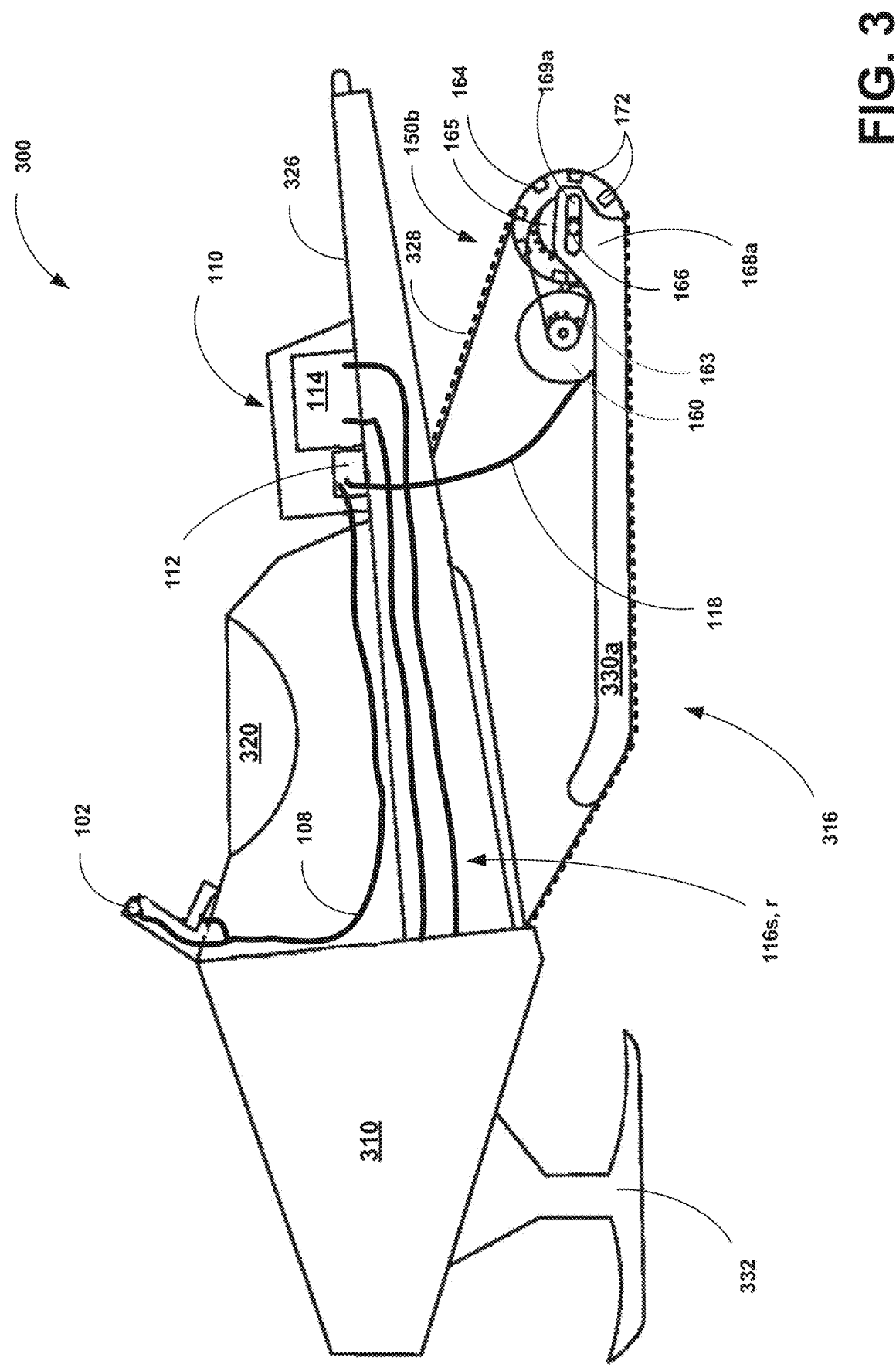
FIG. 3 is a side view of an embodiment of a snowmobile that has been enhanced with installation of an embodiment of the torque assist system of the invention of FIG. 1.

FIG. 3 illustrates snowmobile 300, which has been performance enhanced by the components 100 of the invention. In the case of an OEM snowmobile, the engine and drive mechanism are located forward of the seat and are covered by a fairing 310. The internal combustion engine, the engine drive system and cooling system are all obscured by the fairing 310 but are similar to the that of the snow bike of FIG. 2. The snowmobile also has a steering ski 332 (usually a pair of them) and a track system that also includes a tunnel 326, a track 328, and suspension rails 330*a* and 330*b* (not shown).

In this embodiment of the enhancement components 100, the electric motor is a spindle motor 150*b*. The spindle motor includes a spindle drive motor 160 with an axle 162, a rear drive 165 having a live axle 166, and a sprocket 165 that is coupled to the spindle motor through chain 163. The rear drive and its axle are turned by the spindle drive motor 160 and chain 163 through sprocket 164. Brackets 168*a* and 168*b* (not shown) are configured to support the live axle 166 of rear driver 164 through slotted openings 169*a* and 169*b* (not shown). They replace brackets originally configured to support the track tensioner originally provided with snowmobile 300. The controller 112 and batter housing 114 are located behind the seat and surrounded by fairing 110. They are supported by the track system 316.

Battery temperature-assist coolant lines are coupled to the equivalent cooling line to that of the snow bike of FIG. 2, which carries cooling fluid that is exiting the engine and has therefore been heated by the engine of the snowmobile 300. Electrical harnesses 108 and 118 are coupled in the same manner as described for the snow bike 200 of FIG. 2. In this embodiment, harness 118 is coupled to the spindle drive motor 160.

Figures 4A, 4B:
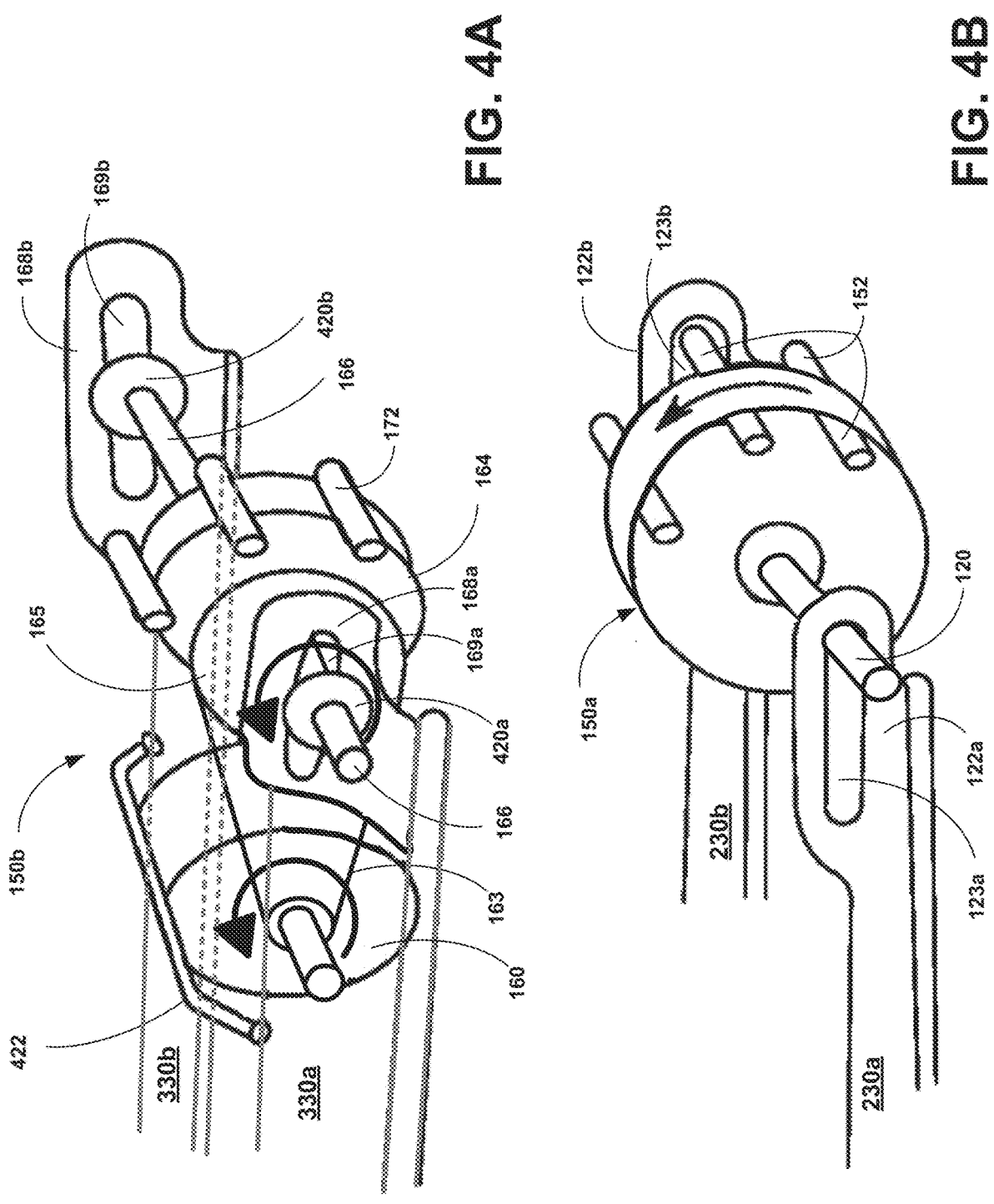
FIG. 4A is an embodiment of an electric spindle motor adapted to be used as part of an embodiment of the torque assist system of the invention of FIG. 1.
FIG. 4B is an embodiment of an electric hub motor adapted to be used as part of an embodiment of the torque assist system of the invention of FIG. 1.

FIG. 4A is an elevated view of the spindle motor 150*b*. In this view, both suspension rails 330*a, b* are shown, as well as both brackets 168*a, b* supporting live axle 166 coupled to rear drive 164 in slots 169*a, b*. In addition, bearings 420*a, b* are shown that facilitate the spinning of live axle 166. In an embodiment, the spindle motor is mounted to suspension rail 422, that itself is supported at each end by suspension rails 330 *a, b*. Those of skill in the art will appreciate that track engaging features 172 can be of any form required to properly engage with the track 328 of snowmobile 300. They will also span the entire circumference of the rear drive 164 but have been limited in this view for ease of illustration.

FIG. 4B illustrates an elevated view of the hub motor 150*a*, that also illustrates both suspension rails 230*a, b* and both replacement brackets 122*a, b* supporting the fixed axle 120 in slots 123*a, b*. Those of skill in the art will appreciate that track engaging features 152 can be of any form required to properly engage with the track 228 of snow bike 200. They will also span the entire circumference of the hub motor 150*a* but have been limited in this view for ease of illustration.

Figures 5A, 5B:
FIG. 5A is a plan view of an embodiment of a fairing for a snow bike that houses the battery and a motor controller that controls the electric motor of the torque assist system of the invention.
FIG. 5B is a plan view of an embodiment of a fairing for a snowmobile that houses the battery housing of FIG. 1 and a motor controller that controls the electric motor of the torque assist system of the invention.

FIG. 5A illustrates a closer view of the fairing 110 enclosing the controller 112 and the battery housing 114 for the enhanced snow bike 200 of FIG. 2. If the fuel tank 224 is originally located under the seat 220, it may need to be shifted rearwardly along the tunnel 226 to accommodate the controller 112 and the battery housing 114. Given that the weight of a snow bike (as with any dirt bike or motorcycle) should be centered under the rider to promote balance, the fuel tank 224 may be moved only just enough to fit the controller 112 and the battery housing 114.

Those of skill in the art will appreciate that fairings are common to motorcycles and dirt bikes. They come in many forms and materials and are typically designed to cover and isolate components of these machines, primarily for aesthetics and aerodynamics. They are often custom made to fit particular brands and models of such machines because the component arrangements are often substantially different between brands as well as models of even the same brand.

In the example of snow bike 200, the fairing serves another purpose which is important in snow conveyance machine applications. It also prevents snow and other forms of precipitation from building up under the seat and impacting the integrity of the controller 112 and batter box 114. Because fairings are typically customized for each configuration of bike brand and model, fairing 110 may be differently formed or located, but it is configured to enclose the controller 112 and battery housing 114 to isolate it from snow and the elements.

The fairing 110 of FIG. 5A is configured to use the underside of the seat 220 and the surface of the tunnel 226 as natural boundaries of the enclosure formed by the fairing 110. Fuel tank 224 is illustrated from under the seat 220 and thus exceeds the upper and lower boundaries of the fairing 110. Thus, an opening 720 is provided in fairing 110 to permit the fuel tank 224 reside partially inside of fairing 110. See also FIG. 2. Exhaust pipe 223 also originally runs through the space enclosed by the fairing 110, and this also has an opening through it protrudes to vent the exhaust to the ambient environment. Adjustable vents 702 are also provided in the fairing 110 to permit cooler ambient air to be vented into the area enclosed by the fairing 110 if desirable. These vents can be equipped with snow filters to prevent ingress of snow through the vents 702, while permitting the ingress and egress of air therethrough. The vents 702 can be louvered to permit opening and closing them using a lever for example.

FIG. 5B illustrates a fairing 110 for the snowmobile 300 of FIG. 3. In the case of the snowmobile 300, weight distribution is not so critical and thus it is easier to place controller 112 and battery box 114 into fairing enclosure 110 configured in the form of a box that can be fixedly coupled to the top surface of the tunnel 326. A levered catch 704 and hinges can make for easy access to the components in the interior of the fairing 110.

Figures 6, 7:
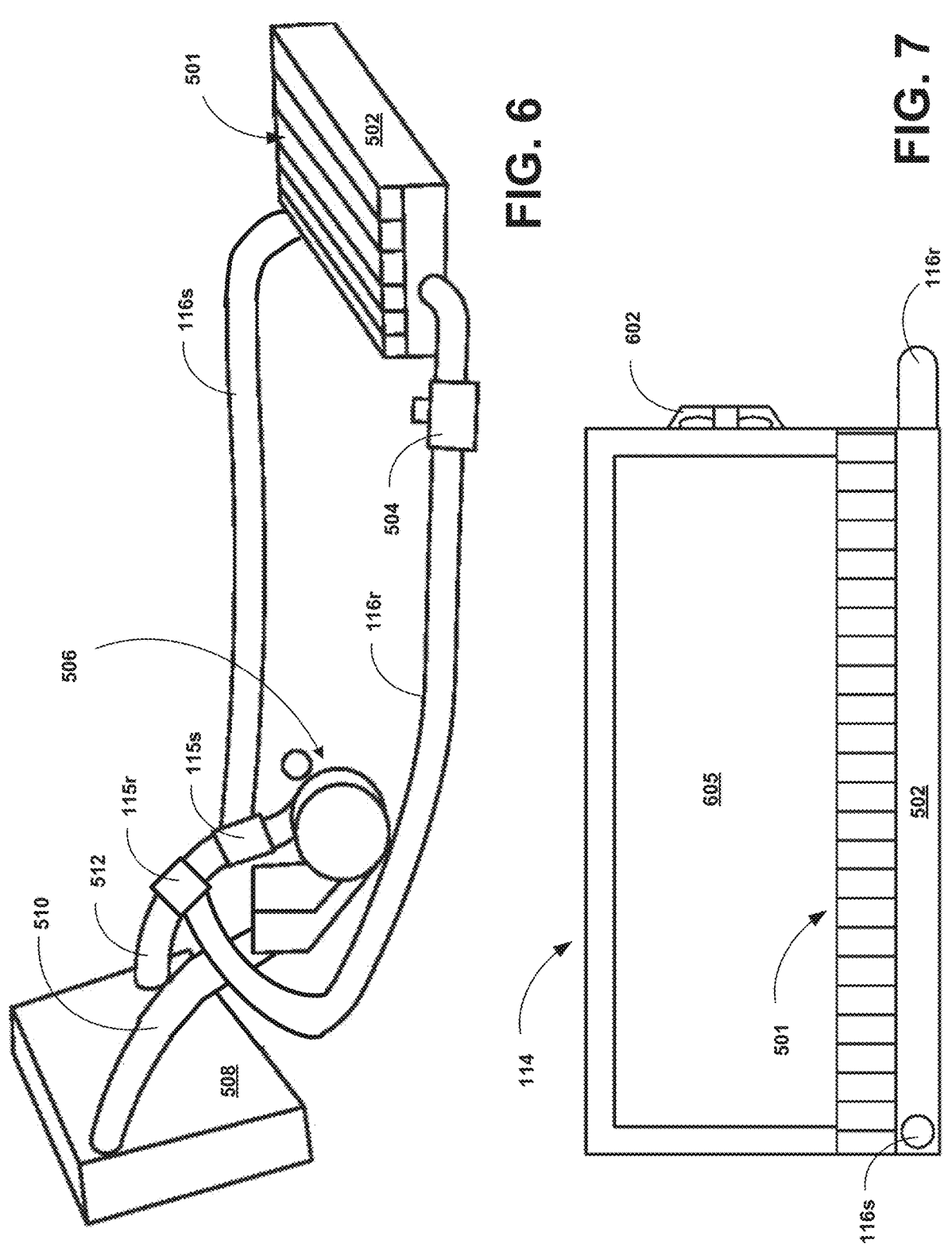
FIG. 6 is a conceptual representation of an embodiment of a heating system for the battery that supplies the electric motor of the torque assist system of the invention.
FIG. 7 is a side view of an embodiment of a battery housing containing the battery and heat exchanger of the heating system of FIG. 5.

FIG. 6 illustrates an embodiment of the battery temperature-assist system of the invention, and one configuration for coupling the components thereof into the cooling system of engine 506. During normal operation, engine 506 receives cooling fluid pumped through the heat exchanging means 508 and through engine coolant supply line 510. Heat exchanging means 508 can be suitable form of heat exchanger such as a radiator, tunnel cooler or the like. As the cooling fluid passes through the engine 506, heat generated by the engine is transferred to the cooling fluid to cool the engine. As the heated cooling fluid exits the engine and into coolant return line 512, the heated cooling fluid is pumped to back to the radiator 508, which serves to transfer the heat from the cooling fluid passing therethrough to the ambient air. The coolant lines 510, 512 of the engine cooling system of a snow conveyance system are typically ¾" in diameter.

The source coolant line 116*s* of the battery temperature-assist system can be coupled into the engine coolant return line 512 using T fitting 115*s*. The diameter of source coolant line can be for example, half of the diameter size engine coolant return line 512 so that half of the cooling fluid is diverted to assist the battery temperature. The diverted cooling fluid is pumped through heat exchanger 502 and out into battery temperature assist return line 116*r*. A thermostatically controlled valve 504 (e.g. a ball valve) is disposed within return coolant line 116*r* that is configured to close off further circulation of the cooling fluid if the coolant fluid exiting the heat exchanger 502 exceeds for example, 100 degrees F. Such an exit temperature for the cooling fluid will indicate that the temperature requires no further temperature assistance. Return coolant line 116*r* of the battery temperature-assist system is then coupled back into the engine coolant return line 512 using T fitting 115*r*, down stream from where the source coolant line 116*r* is coupled into the engine coolant return line 512.

Those of skill in the art will appreciate that some engine cooling systems have a bypass line between the engine coolant return line 512 and the engine coolant supply line 510 that permits bypassing of the heat exchanging means 508 on a cold start to help the engine warm up faster. The cooling fluid is diverted to the bypass line by a thermostatically controlled valve that diverts the fluid into the bypass line until the cooling fluid exiting the engine reaches a predetermined temperature. If the engine cooling system has such a bypass, coolant supply line 116*s* to the battery 605 can be coupled into the engine coolant return line 512 at or upstream from the valve controlling the bypass.

FIG. 7 illustrates a plan view of the battery box or housing 114. Battery pack 605 rests on, or in proximity with, the fins 501 of heat exchanger 502. The heated fluid enters heat exchanger 502 via supply coolant line 116s and transfers heat from the cooling fluid to the fins 501 of the heat exchanger 502 as the cooling fluid flows through the base of the heat exchanger, out through return coolant line 116r and back to the engine cooling system. The heat exchanger 502 can be made of any material having suitable heat transfer characteristics, such as aluminum. The housing can be made of any thermal insulating material such as thermal insulating plastic to hold in the heat provided by the heat exchanger as well as the heat ultimately generated by the battery. Electrostatically controlled fan 662 is configured to turn on when the internal temperature exceeds a predetermined temperature, such as 100 degrees F.

Figure 8:
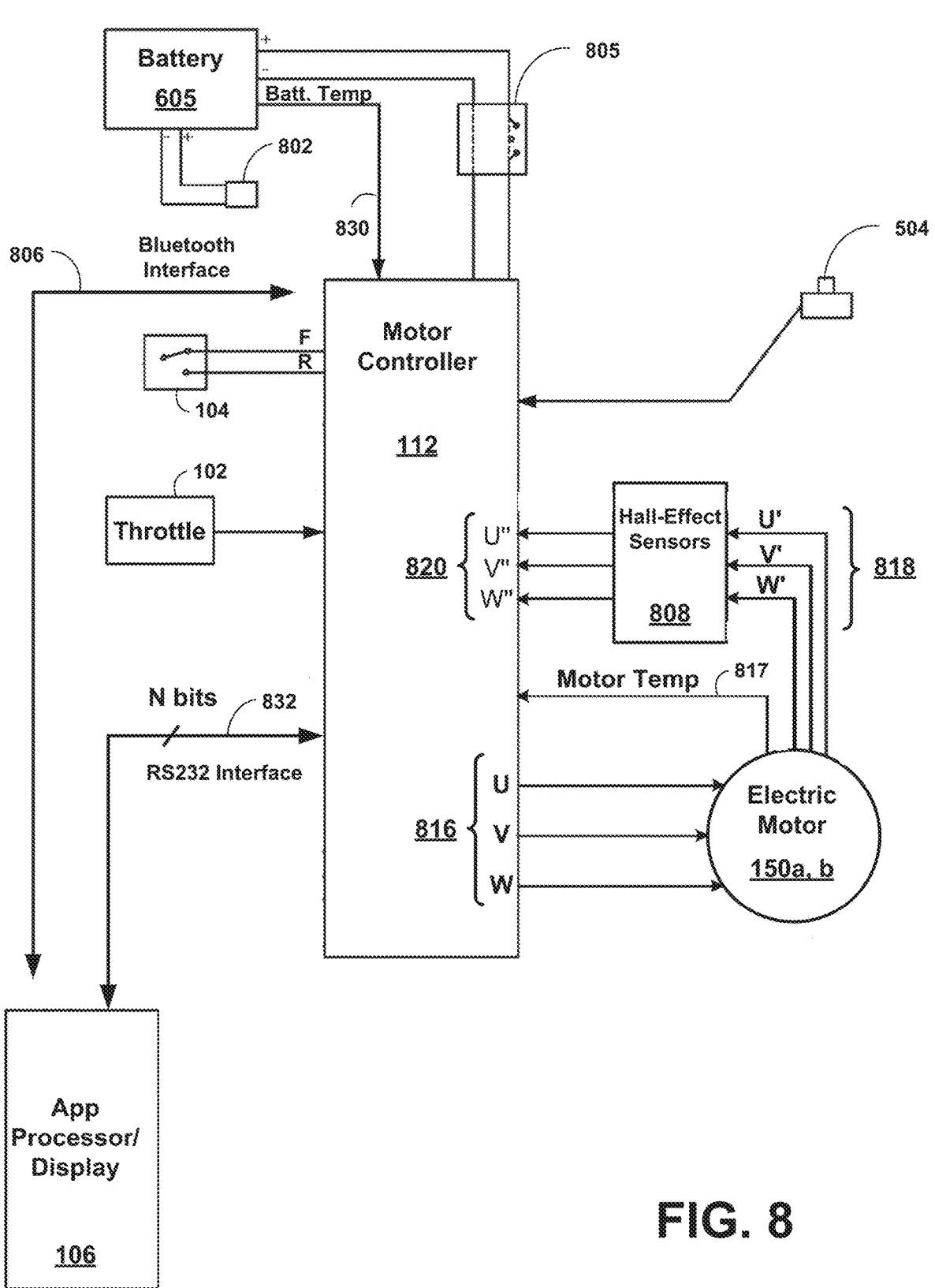
FIG. 8 is a simplified conceptual diagram of an embodiment of the controller of the torque assist system of the invention.

FIG. 8 illustrates a simplified block diagram for controller 112. Those of skill in the art will appreciate that there are many commercially available motor controllers designed for brushless DC motors such as hub 150a and spindle motor 150b. Many of them are purpose designed for controlling such motors for vehicular applications. A few examples include the BAC8000 Controller by Accelerated Systems™ Inc. and the KHB 14401 BLDC motor controller by Kelly Controls, Inc.

Controller 112 essentially provides a fixed DC voltage (e.g. 12 volts) to energize each pole of the electric motor 150a, b and controls the current delivered to each pole (U, V, W) in accordance with the position of the torque assist throttle 102, which thereby controls the torque produced by the motor to assist the engine in turning the tack. The speed at which the shaft of the motor turns, and thus the speed at which can turn the track of the snow conveyance machine is dictated by the torque and the load on the motor.

Controller 112 is therefore coupled to the battery 605, and to the motor to source current to the poles through outputs U, V and W 816. Outputs U', V' and W' 818 provide positional information for the rotor that is sensed by hall effect sensors 808 and are provided as feedback signals as inputs U", V", W" 820 to tell the controller 112 which phase or pole should be energized. A Motor Temp sensor signal 817 is provided as an input to controller 112 to enable the controller 112 to monitor the temperature of the motor 150a, b. This enables the controller 112 to cease driving the motor 150a, b if, for example, the motor 150a, b exceeds a predetermined temperature, such as 100 degrees F. These signals are provided between the controller 112 and the motor 150a, b through electrical harness 118.

Those of skill in the art will appreciate that the size of the battery 605 and the power provided by the electric motor 150a, b should be determined based on the type of performance sought to be achieved. In an embodiment, the battery 605 can discharge between 8,000 and 60,000 watts of phase power to the electric motor 150a, b. A circuit breaker 805 is placed across the terminals of the battery 605 and is rated for between 100 and 600 amps of current from the battery 605 and provides a main power switch for turning on the torque assist system of the invention on startup of the enhanced snow conveyance machine.

Figures 9A, 9B:
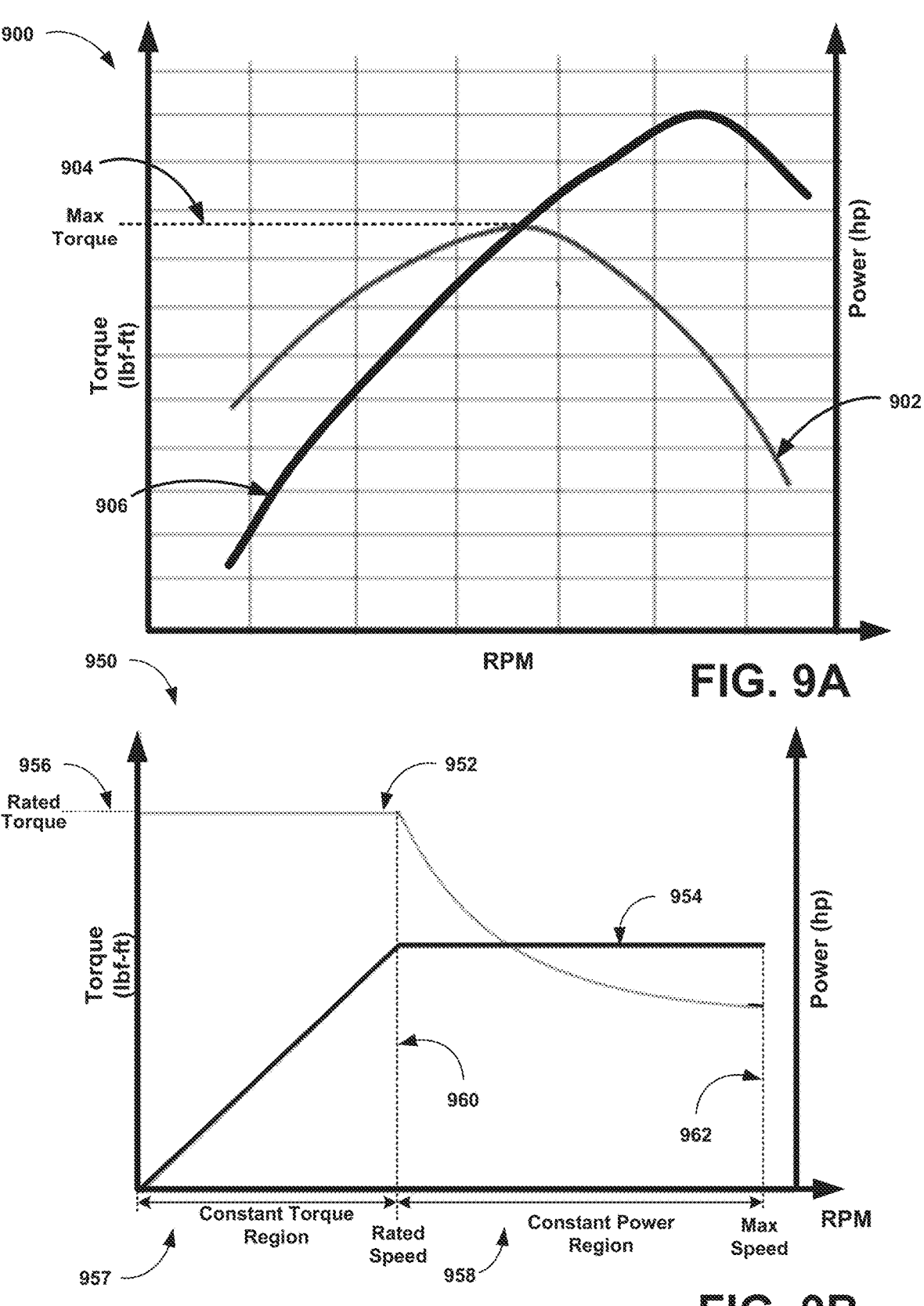
FIG. 9A is a graph depicting torque and power curves for a generic combustion engine that might be used as a component of the torque assist system of the invention.
FIG. 9B is a graph depicting torque and power curves for a generic electric motor having permanent magnets that might be used as a component of the torque assist system of the invention.

The choice of what type of motor 150a, b for a given application is also a consideration that depends upon the type of performance enhancement one seeks in employing the torque enhancement system of the invention 100, and that determination is influenced by the performance curves of the internal combustion engine (ICE) with which the electric motor is to be paired. FIG. 9A illustrates a typical torque 902 and power 906 vs. track speed (RPM) graph 900 for a generic ICE. As will be appreciated by those of skill in the art, a combustion engine typically produces its maximum torque 904 (and power 906)) at higher ranges of engine RPM. This is why the drive systems of ICEs are typically geared, so that they can get to the range of track RPMs where they produce their peak torque and power, even when the speed of the vehicle itself is still low.

FIG. 9B illustrates a typical torque 952 and power 954 vs. track speed (RPM) graph 950 for a generic brushless DC (BLDC) motor. It will be appreciated by those of skill in the art, that an electric motor such as a BLDC motor is able to produce virtually instant torque from zero track RPMs, unlike the ICE. By coupling an electric motor such as a BLDC motor to drive the track system of a track driven vehicle in parallel with the ICE, it will be appreciated that the electric motor can be used to provide rated torque 956 at 100% of maximum throttle, which remains substantially constant over a range (the Constant Torque Range 957) of track RPM up to the point at which the Rated Speed 960 of the motor is reached. After that, the power 954 is constant (Constant Power Range 958) of track RPM as the torque 952 decreases. The torque 952 will decrease until the net voltage across the magnets of the BLDC motor reaches zero, due to the increasing back EMF generated by the motor as the motor speed increases. At this tack RPM, the torque 952 will be zero and the motor will stall at its maximum speed 962.

Thus, depending upon the values of peak or maximum torque of the ICE, a specific motor design can be chosen to provide its rated torque over a range of RPMs starting substantially at zero as shown in FIG. 9B, and that spans some or all of the gap in torque generating performance of the ICE illustrated by FIG. 9A. For example, hub motors 150a typically deliver higher rated torque over a smaller range of RPM (e.g. to about 1800) RPMs of the track and the motor 150a. This makes hub motor 150a advantageous for supplementing available torque when the engine is loaded at lower RPMs of the track, such as hill climbing, low speed off trail operation (e.g. boondocking) or hauling heavier loads.

Figure 9C:
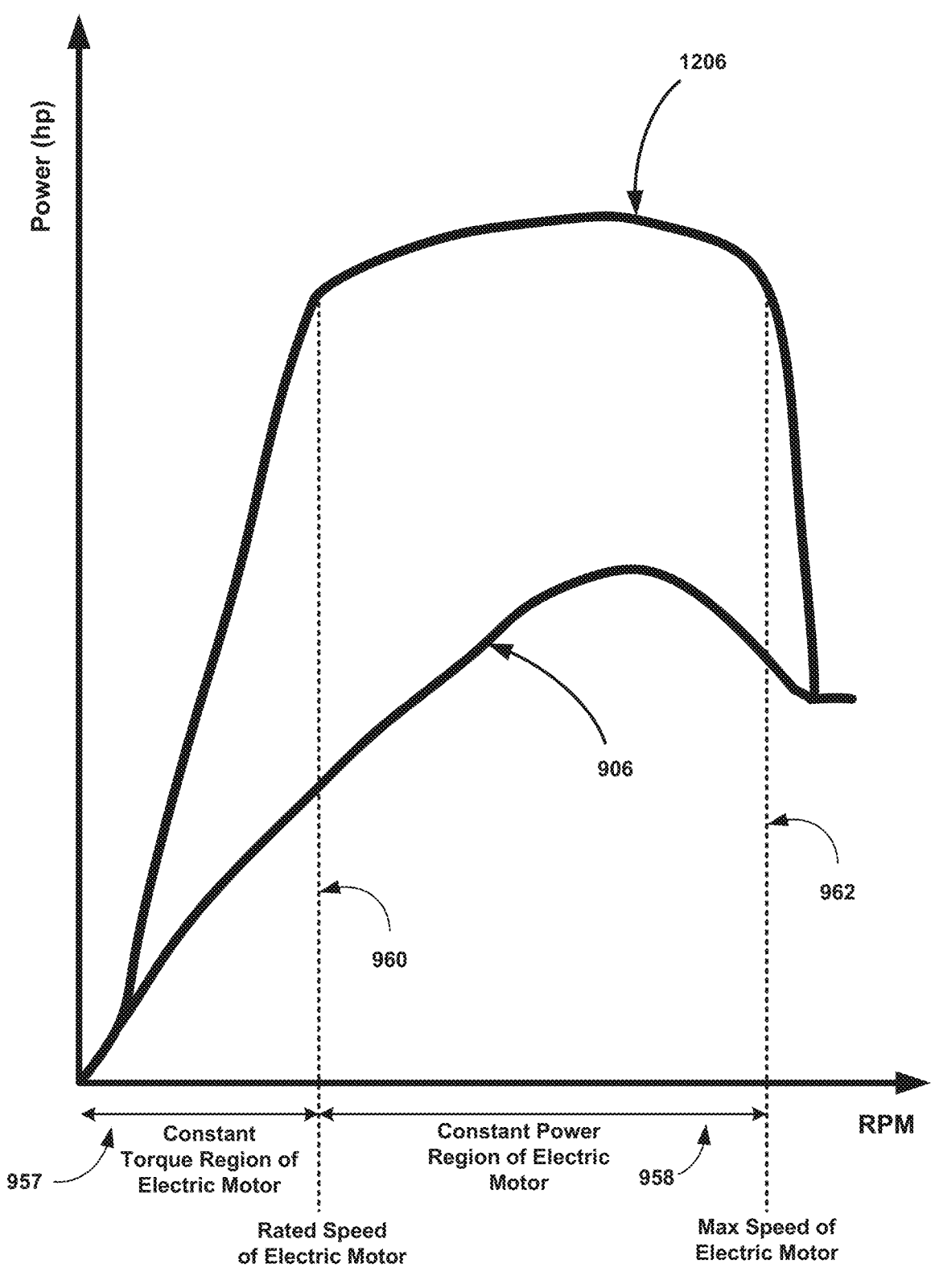
FIG. 9C is a graph depicting an approximation of the horsepower of a combination of the engine of FIG. 9A and the motor of FIG. 9B when combined as part of the torque assist system of the invention.

FIG. 9C illustrates a power curve 1206 that reflects the synergistic power generated by the parallel combination of both the ICE and the electric motor 150a, b as a combination of the ICE power curve 906 of FIG. 9A and the power curve 954 of the electric motor. The power curve for the electric motor is not shown in FIG. 9C for the sake of simplicity, but the regions of constant torque (or linear power) 957 and constant power 958 ranges of track speed in RPMs are shown as delineated by the motor first reaching its rated speed 960 and finally its maximum speed. Those of skill in the art will appreciate that these curves show the power curves individually and as combined for a given throttle position and a given gear ratio. But regardless of the throttle level, the peak power of both the ICE and electric motor at the given throttle level are made available and additively combined to turn the track as illustrated.

By coupling both the ICE and the electric motor in parallel to the track, they are free to generate their own available power to the task of turning the track. Thus, if the graph of FIG. 9C shows a combined output power for the ICE and the electric motor with both at full throttle, the combined power curve 1206 represents the additive combination of the maximum available power that can be supplied by each for the given track RPM up to a maximum track RPM that can be achieved through the combination. For a snow bike, the user could apply full throttle to both the electric motor and the ICE, with the snow bike in third gear, and the electric motor will initially dominate the generated power generated until the track RPM causes the ICE in third gear to reach a level of RPM at the crankshaft at which the ICE can generate significant torque, and therefore the power, to significantly add to the overall power produced to turn the track. In this way, the time it takes to achieve the level of RPM for the ICE is significantly reduced from how long it would take to get there by itself. Those of skill in the art will appreciate that the electric motor can also be geared to either increase or decrease the range of track RPM over which torque is delivered before reaching the motor's maximum speed. As the range is increased, the rated or maximum torque will decrease, and as the range is decreased, the rated or maximum torque will increase.

Spindle motors 150b are capable of producing less rated torque and power, but operate up to a higher RPM (e.g. 6400-7500 RPM). This may render spindle motors 150b more advantageous for high-speed applications (45-120 MPH), such as trail and flat track racing of snow conveyance machines. Thus, the spindle motor 150b produces its lower rated torque, but that can be generated to a range of RPMs more useful to aiding acceleration just before the ICE is in range of producing its own peak torque. The hub motor achieves its higher rated torque over a narrower range of RPMs and adds more weight because of the extra components required to install it.

Controller 112 can further include a bus or a serial data interface that enables data to be downloaded to the microprocessor of the controller 112 from the processing device and display 106. For example, a Bluetooth coupling 806 between the processing device 106 and a serial bus input of the controller 112 would enable interchangeable processing devices 106 to be used. A more robust coupling may be accomplished through a hard-wired bus interface of n bits between them such as an RS232 interface 832. This capability enables the torque profile of motor 150a, b to be altered, thereby enhancing its ability to assist in providing additional torque to better achieve the desired performance for the current use of the snow conveyance machine. The torque profile may also be changed to simply reflect the personal preferences of a given user. Apps can be installed on the processing device 106 that can provide a choice of profiles for selection through the user interface of the processing device. These choices can be dictated by the specific configuration of the torque enhancement system 100.

Additional inputs can also be provided to the controller 112 from the torque enhancement system 100 of the invention to aid the controller 112 in providing additional features and protective functions. The thermostatic control of the ball valve 504 residing in the battery temperature assist system can provide additional information regarding the temperature of the battery. Likewise, the thermostatic control of the fan in the battery housing can provide battery temperature signal 830 to the controller 112 to limit the current so that the battery 605 does not overheat. In addition, a signal supplied to the controller by forward/reverse toggle switch 104 will cause the controller 112 to operate in either a forward or reverse mode.

In addition, those of skill in the art will appreciate that a DC brushless motor produces a back EMF (electromotive force) that is overcome by the applied voltage when driving the motor. When the motor 150a, b is rotated by application of an external force against the back EMF (i.e. by coasting downhill due to gravity or because the engine is turning the track, current is generated that is supplied back to the battery 605 and therefore recharges the battery. This is known as regenerative braking. Controller 112 can be configured to place the motor 150a, b in regenerative braking mode whenever the torque assist throttle 102 is at zero. In addition, the back EMF can be increased or decreased to increase or decrease the level of recharging that takes place. Thus, a user can adjust the braking level by increasing the back EMF. This can be adjusted directly through a switch to produce as braking level input to the controller 112, or it can be input or selected though the user interface of the processing device and display 106 and over harness 108 or by way of Bluetooth interface 806. A charging port 802 is provided by which to externally charge the battery 605 should it be required.

A user can apply torque generated by the electric motor 150a, b manually by simply advancing the electric motor torque assist throttle 102 in various circumstances in which there is a benefit in performance to be derived. For example, the ICE of a snow bike can be roll-started on a substantially flat surface by first using the motor to get the snow bike rolling with the clutch engaged, and then popping the clutch to start the ICE. The more efficient way to manually apply torque to a snow bike with an already running ICE is to place the snow bike in low gear to get it rolling, and then to advance the torque assist throttle 102 to add torque to the snow bike.

When such vehicles (including snowmobiles) are being operated at lower track RPMs, such as while boondocking in the trees, a sudden drop in ICE performance because of sudden increases in load from heavy snow or steep inclines can be overcome by advancing the torque assist throttle 102 to increase the torque applied to the track to offset the increase in load. If the vehicle becomes bogged down in the snow, a user can advance both throttles to ensure enough torque to advance the track. When racing a snowmobile, for example, the user can wait to advance the torque assist throttle 102 until the speed of the track is approaching the range of RPM's for which the ICE can generate maximum torque and power. This would be the functional equivalent of giving the ICE a boost of nitrous oxide.

Torque assist throttle 102 can produce a 0-5V that is received by the controller. A value of 0 volts can represent zero torque assist, and a 5V value can represent maximum available torque assist. While this output can be manually generated by a manually actuated throttle that actuates a potentiometer, the torque assist throttle 102 can also be automatically generated in accordance with a torque assist app that receives inputs from the ICE controller that indicates when the ICE may be experiencing an increase in load at an RPM and in a gear that would benefit from torque boost from the electric motor 150a, b. The app can then determine an appropriate percentage of maximum torque assist throttle to send to the controller 112. This would permit a user who does not wish to operate a separate torque assist throttle to settle for an automatically generated torque assist. The app can be executed on the processing device 106, that would generate the torque assist throttle 102 output through calculations executed by the software based on the parametric information received from the engine controller. The app could also be used to determine from the parametric data when to enter the regenerative braking mode as well.

Controller 112 can also provide parametric feedback to the user through the user interface of processor and display device 106. This information can include the current regenerative braking level, the current torque profile selected, battery temperature, motor temperature, Forward/Reverse mode, torque assist level, system voltage, etc. All of these signals can be transmitted over individual pin connections, RS232 bus 832 or Bluetooth interface 806.

Figure 10:
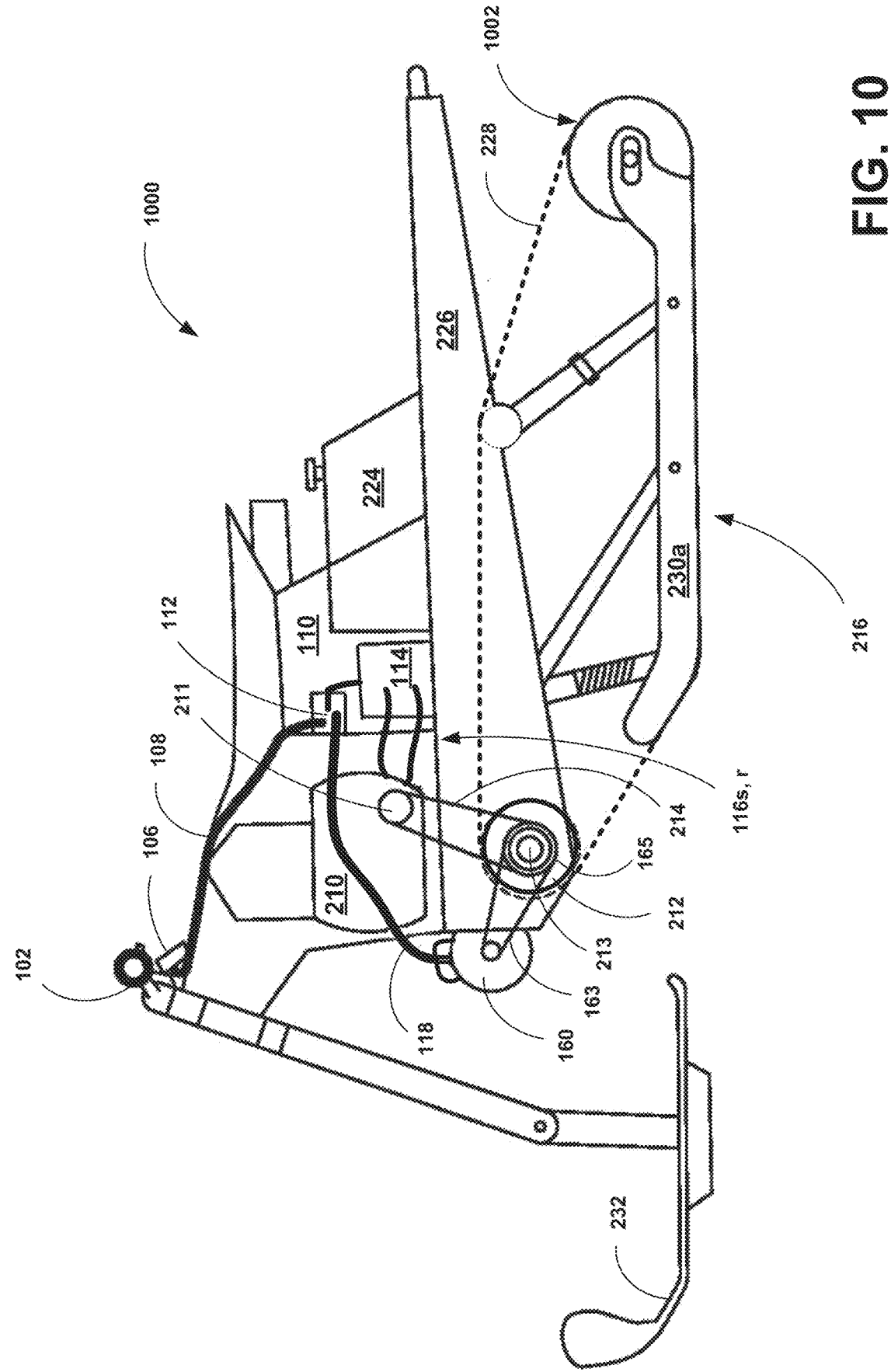
FIG. 10 is a side view of an embodiment of a snow bike illustrating an alternative technique for installation of the electric motor to engage the track of the snow bike.

FIG. 10 illustrates an alternate embodiment 1000 of the snow bike 200 of FIG. 2 that has been enhanced with the torque assist system 100 of the invention. In this embodiment, the drive system is substantially the same as in FIG. 2 and is coupled to the rear track system 216 by coupling the crankshaft 211 of engine 210 to the jack drive 212 of the ear track system 216 through a chain 214. However, instead of installing a hub drive motor 150a at the back of the rear track system 216 in lieu of the track tensioning wheel 1002, a spindle drive motor 160 is mounted on the frame of the snow bike 1000 at the opposite side of the track 228 from the jack drive 212. The spindle drive motor 160 is then coupled to a sprocket 165 through chain 163, sprocket 165 being proximal to the spindle drive motor 160 that is coupled to the jack shaft 213 at the opposite end of the jack shaft from the jack drive 212. Because the spindle drive motor 160 is directly coupled to the jack shaft 213, no rear driver (164, FIGS. 1 and 5A) is required to drive the track. This renders installation simpler and eliminates the weight of the rear track driver. The spindle driver motor 160 does not have to be mounted on the parallel suspension rails 230a and 230b as shown in FIG. 5A.

Every other aspect of the torque assist system 100 of the invention is virtually the same. The harness 118 is coupled between the motor controller 112 and the spindle drive motor 160. Harness 108 is couples the controller 112 to various control inputs such as the forward/reverse toggle switch 104, torque assist throttle 102 and the processing and display device 106. The battery temperature assist coolant supply and return lines 116s, r are still coupled between the engine coolant return line 512 and the heat exchanger 502 in battery housing 114. The controller 112 and the battery housing 114 are still located in the same place and protected by fairing 110.

Figure 11:
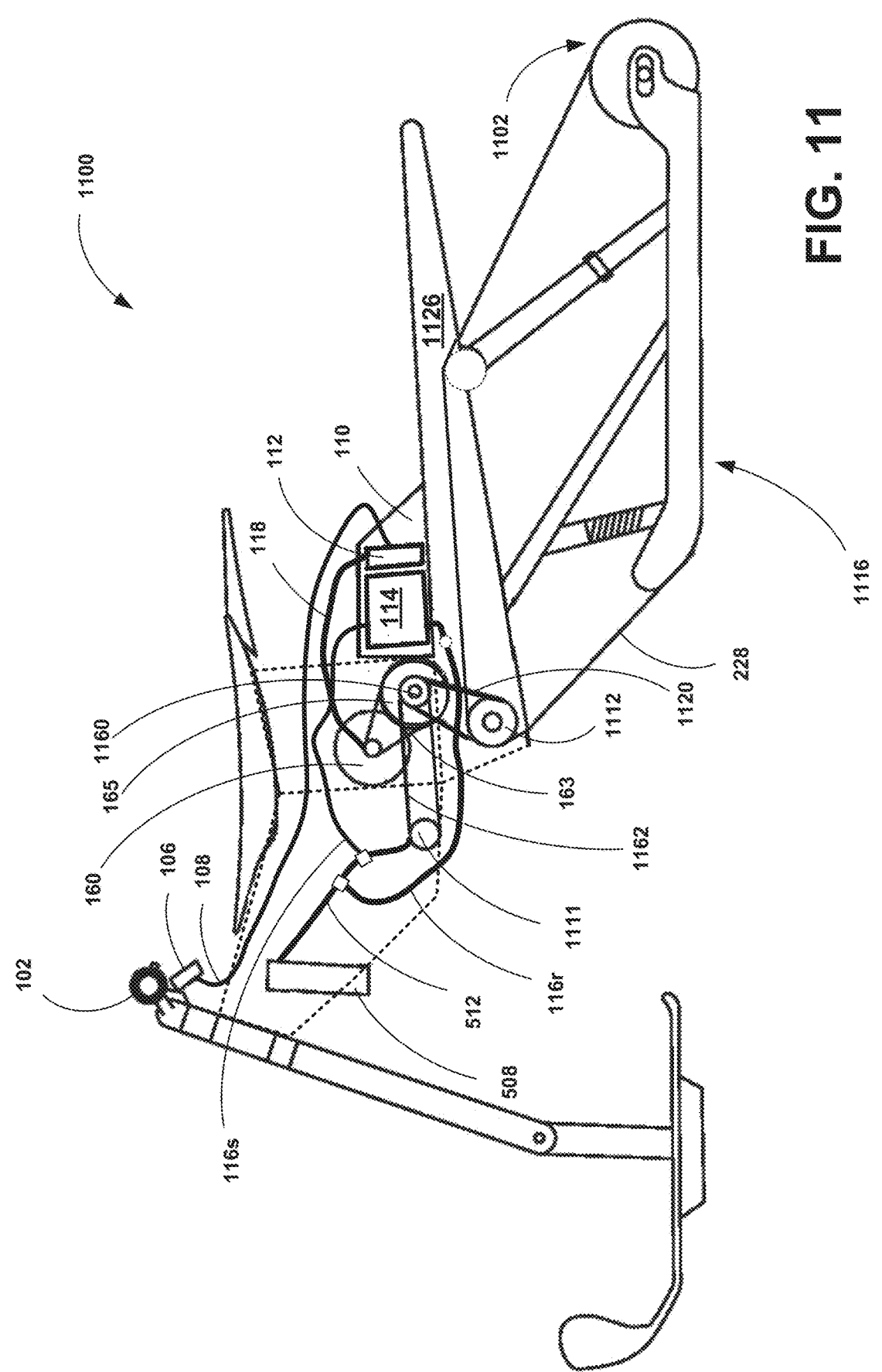
FIG. 11 is a side view of an embodiment of the snow bike employing a second alternative technique for installation of the electric motor to engage with the track of the snow bike.

FIG. 11 illustrates another embodiment of a snow bike 1100, wherein a spindle motor 150b is used as part of the torque assist system 100 of the invention, where like in the embodiment of snow bike 1000 of FIG. 10, it is directly incorporated into the drive system of the snow bike rather than being installed at the back of the rear track assembly 236. Snow bike 1100 is a different model with a drive system that includes crank shaft 1111 (the full engine is omitted for simplicity) that turns a drive shaft 1160 through chain 1162 that in turn drives jack drive 1112. Jack drive 1112 engages with track 228 of lower track system 1116 to propel the snow bike 1100.

Spindle drive motor 160 is coupled into the drive system by adding sprocket 165 to the drive shaft 1160. Spindle drive motor 160 is thereby able to also turn drive shaft 1060 by way of chain 163 turning sprocket 165. Once again, as in the embodiment 1000 of FIG. 10, the spindle motor 150b of the torque assist system 100 of the invention eliminates the need for a rear drive component 164, FIG. 5A to separately engage with the track 228. The rear track system 1116 is able to remain intact, including track tensioning wheel 1102, and the spindle drive motor 160 can be coupled directly into the drive system of the snow bike 1100. It should be noted that not all models of snow bikes (or the dirt bike/motorcycle from which the snow bike was converted) can accommodate the addition of sprocket 165 to the main drive shaft. As can be seen from FIG. 11, all other components of the torque assist system 100 of the invention are coupled into the snow bike 1100 as previously discussed with other embodiments of snow conveyance machines.

While the same reference numbers for the primary components of the torque assist system 100 of the invention have been maintained throughout, it should not be interpreted to mean that they may not be modified in minor ways to accommodate their installation into various makes and models of snow conveyance machines. For example, the lengths, diameters and T fittings 115s, r illustrated herein for the coolant lines 116s, r may very as various components may be located differently between such makes and models. Further, while the drive systems generally use chains, they may also use belts or other types of drive couplings that fall within the intended scope of the invention. Likewise, electrical harnesses and other forms of electrical interconnect can also vary depending upon the interconnects provided by various commercially available motor controller circuits.

It will be appreciated that while the embodiments described herein are examples of conveyance machines that are configured for snow terrain, it is will be appreciated that the invention is not limited to snow conveyance machines. The performance of any conveyance machine that uses an endless track for its propulsion can potentially be enhanced through the torque assist system 100 of the invention. It will also be appreciated that the hub and spindle motors can be interchangeably used for any type of conveyance machine. The hub motor is motor and driver in one, and thus would be required to engage the track independently of the engine's drive system as illustrated in the embodiment of FIG. 2. The spindle motor can be coupled independently as well, as shown in the embodiment of FIG. 3, or it can be coupled to into the drive system of those that can accommodate such an implementation, as illustrated in FIGS. 10 and 11.

Finally, it will be further appreciated by those of skill in the art that the torque assist system 100 of the invention can be implemented as an aftermarket upgrade package of components that have been customized for installation on various makes and models of such conveyance machines, the torque assist system 100 of the invention can also be built into an OEM purpose built conveyance machine as well.

What is claimed is:

1. A conveyance machine comprising:
an internal combustion engine having a drive system coupled to a track, the engine being configured to apply rotational force to the track through the drive system to propel said conveyance machine in a forward direction along the ground, the engine being configured to produce torque relative to its rotational speed in response to an engine throttle;
an engine cooling system filled with cooling fluid, the cooling system for pumping the cooling fluid through the engine during its operation to draw heat from the engine into the cooling fluid and further through a first heat exchanger by which to transfer the heat from the cooling fluid to ambient air, the engine cooling system having a source coolant line to conduct heated coolant fluid exiting the engine to the first heat exchanger;
an electric motor powered by a battery and being coupled to the track through a motor driver, the electric motor configured to apply rotational force to the track through the driver, in parallel with the engine, to turn the track and thereby propel the conveyance machine in either a forward or reverse direction, the motor being configured to produce peak torque relative to its rotational speed in response to a motor throttle;
a motor controller, the motor controller being coupled to the battery and the electric motor to control the magnitude of current being delivered from the battery to the electric motor in response to a signal provided from the motor throttle to the controller and in accordance with a specified torque profile file; and a battery temperature assist system including:

a secondary source coolant line in fluid communication with the source coolant line of the engine cooling system to divert a fraction of the heated cooling fluid therefrom;

a second heat exchanger in thermal communication with the battery, the second heat exchanger configured to receive the diverted fraction of the heated cooling fluid and to transfer the heat from the heated cooling fluid to the battery as it flows therethrough; and a secondary return coolant line in fluid communication with the source coolant line of the engine cooling system to return the diverted fraction of the cooling fluid back to the engine cooling system, wherein the torque that can be produced by the electric motor peaks over a range of rotational speed of the track that is different than the range of rotational speed of the track at which the torque that can be produced by the engine peaks.

2. The conveyance machine of claim 1, wherein the secondary return coolant line further includes:

a valve disposed therein to interrupt circulation of the diverted fraction of the cooling fluid through the second heat exchanging body when the diverted fluid exits the second heat exchanger at a temperature that exceeds a predetermined temperature.

3. The conveyance machine of claim 2, wherein the valve is a thermostatically controlled ball valve.

4. The conveyance machine of claim 1, wherein the battery housing and the controller are surrounded by a fairing coupled to and supported by the conveyance machine, the fairing providing protection from at least weather-related elements.

5. The conveyance machine of claim 1, wherein the motor controller is coupled to a processing device, the processing device executing an app program that downloads the torque profile when selected from a plurality of torque profiles through a user interface.

6. The conveyance machine of claim 4 wherein the controller places the motor in a regenerative braking mode when the motor throttle is at a zero current position to cause the motor to generate current that re-charges the battery.

7. The conveyance machine of claim 4, wherein the fairing includes snow filtered adjustable vents to allow cool air to moderate the temperature of the battery.

* * * * *